Oct. 10, 1944.  H. J. MURRAY  2,360,258

SELECTIVE FLUID DRIVE POWER TRANSMISSION MECHANISM

Filed Feb. 18, 1941  2 Sheets-Sheet 1

INVENTOR
Howard J. Murray.

Oct. 10, 1944.     H. J. MURRAY     2,360,258
SELECTIVE FLUID DRIVE POWER TRANSMISSION MECHANISM
Filed Feb. 18, 1941     2 Sheets-Sheet 2

Patented Oct. 10, 1944

2,360,258

UNITED STATES PATENT OFFICE 2,360,258

SELECTIVE FLUID DRIVE POWER TRANSMISSION MECHANISM

Howard J. Murray, New York, N. Y.

Application February 18, 1941, Serial No. 379,477

21 Claims. (Cl. 74—189.5)

My invention relates in general to a selective fluid drive power transmission mechanism and specifically relates to a device for selectively affecting and effecting fluid drive speed relations between driving and driven members of a power transmission device.

One of the objects of the present disclosure is to provide a simple form of fluid drive mechanism arranged to derive speed-drive control power from the driving member and thence selectively employ the said derived control power so as to effect and affect speed drive relations of the said mechanism members.

A further object of the present invention is to provide an automatic selective speed-drive transmission with the various parts so arranged as to be automatically controlled in their selective action by fluid controlled elements deriving selective control power from one of the members according to the relative movement of the said driving and driven members.

An additional object of the present invention is to employ selectively controlled fluid drive means so as to selectively control the speed-torque transmission of power from a driving member to a driven member under such conditions that the driving and driven members will acquire proper speed-torque drive relations.

A still additional object of the present invention is to provide a fluid drive means remotely controlled in a selective manner so that the fluid drive relations of the driving and driven members may be manually and/or selectively controlled as a coincidental function of the operation of the vehicle upon which the device is installed and operated.

A still further object of the present invention is to provide a fluid drive couple including a plurality of fluid drive couple elements in parallel drive relation and a common fluid drive element selectively in fluid drive relation with the parallel elements.

The present disclosure also contemplates the use of a bi-directional selective fluid drive means including a selective fluid drive control portion automatically energized by power derived from the driving member according to the torque load on the driven member.

The present disclosure is a further development of the invention disclosed in my U. S. applications Nos. 353,441, filed August 21, 1940, and 367,944, filed November 30, 1940. My U. S. Patent No. 2,208,224, issued July 16, 1940, should also be noted.

While the present invention is obviously capable of use in any location wherein it is desired to transmit power at selective fluid drive relations from one power member to another, the present invention is particularly applicable to a selective fluid drive power transmission mechanism for use in connection with automotive vehicle construction, and it is in this connection that embodiments of the present invention will be described in detail.

In the drawings:

Figure 6 is a view in vertical section taken axially above the main shaft of a portion of a modification of the selective fluid drive control portions of Figures 1, 4 and 5.

Figure 7 is a view in vertical section taken axially of portions above the main shaft of still another modification of the fluid drive control portions of Figures 1, 4 and 5.

Figure 8 is a view in vertical section taken axially above the main shaft of an additional modification of the present disclosure showing a combination of means for remotely and/or selectively controlling the fluid drive relations of the driving and driven members of Figure 1.

Figure 12 is a diagrammatic presentation of a section of one of the connecting spokes of one of the selective fluid drive control elements of Figures 1, 4 and 5.

Figure 13 is a diagrammatic presentation of a section of a modification of the connecting spoke of Figure 12.

Figure 14 is a partial sectional plan view showing the operative relation of the fluid drive member vanes and the selective fluid drive control portions of Figures 1, 4 and 5 as the flow of the driving fluid is interrupted along its path.

Figures 15, 17 and 18 are diagrammatic presentations of three relative operative positions of the selective fluid drive control means of Figures 8, 9, 10 and 11 to selectively effect approximate conventional overspeed, direct and low speed drive relations between the driving and driven power members of Figure 1.

Figures 16, 19 and 20 are diagrammatic presentations of the operative relations of the selective fluid drive control portions of the control means of Figures 8, 9, 10, 11 and 15.

In the following description and in the claims, parts will be identified by specific names for convenience of expression, but they are intended to be as generic in their application to similar parts as the art will permit.

Figures 1, 2, 3:
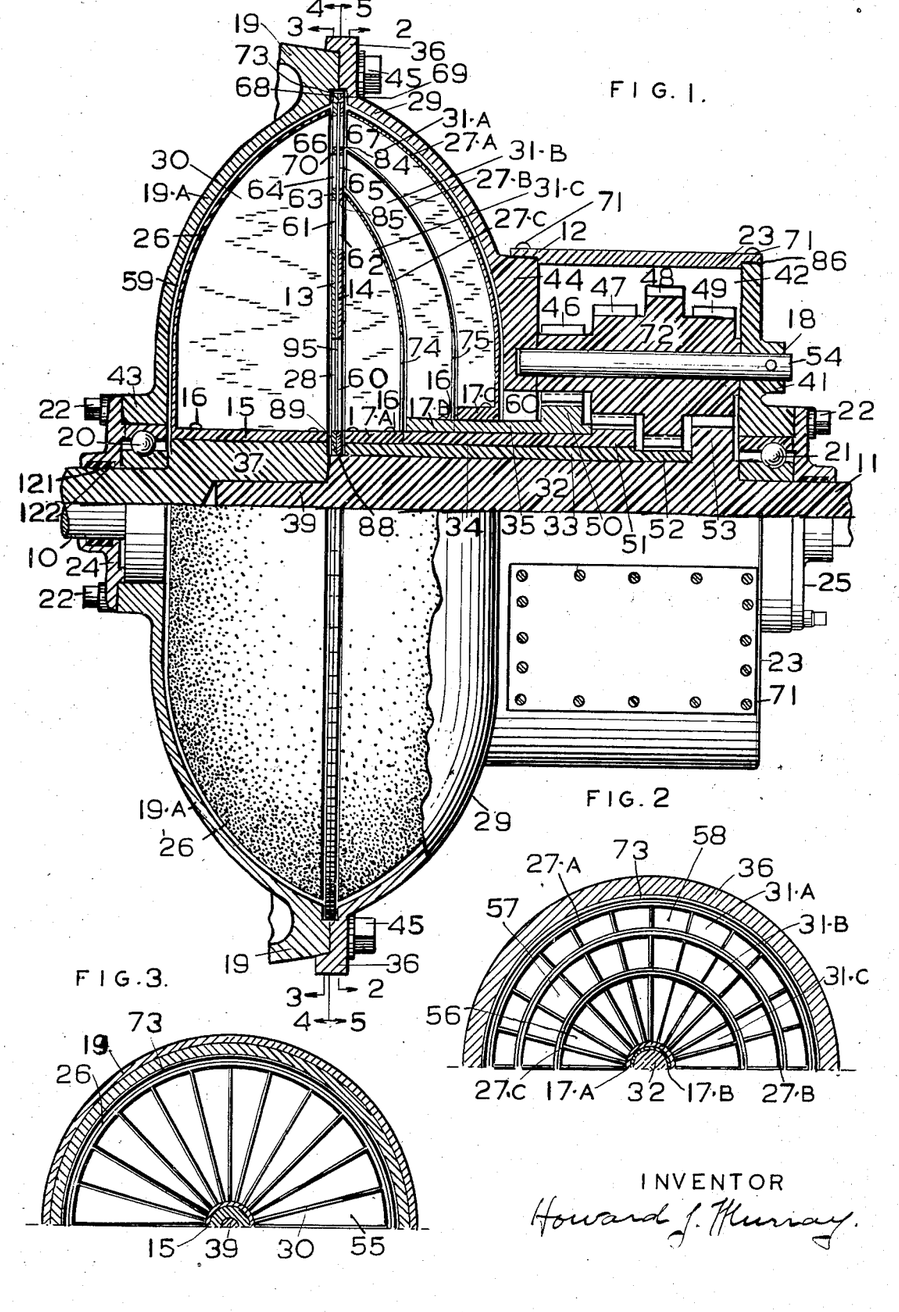
Figure 1 is an embodiment of the present invention partly in vertical section taken axially of the main shaft.
Figure 2 is an end view in vertical elevation of the selective fluid drive elements in parallel drive relation taken along the line 2—2 of Figure 1 looking in the direction indicated by the arrows.
Figure 3 is an end view in vertical elevation of the common fluid drive couple element taken along the line 3—3 of Fig. 1, looking in the direction indicated by the arrows.

There is shown by Figure 1 of the drawings a novel selective speed fluid drive means and associated power transmission parts including a pair of power shafts 10 and 11 disposed in axial alignment with their adjacent ends including the reduced portions 39 of the shaft 11 and the portion 37 of the shaft 10 interfitted to provide proper bearing surfaces.

The power shafts 10 and 11 are mounted for independent rotary movement respectfully in suitable bearings 20 and 21.

While either of these power shafts 10 and 11 may be considered as the normal driving member of the said mechanism, it will be understood for the purpose of this description that the shaft 10 is the normal driving member, and is operatively connected to be driven from a source of power (not shown) such as an internal combustion engine.

Accordingly shaft 11 is regarded as the normal driven member, and is connected to whatever mechanism (not shown) it is desired to drive.

The shaft 11 is preferably made of a good quality of steel and formed with the radially extending toothed portion 53 and the end portions 32 and 39. The portion 32 is formed to receive and support the rotatably mounted tubular member 33 formed with the toothed portion 52. A second rotatably mounted tubular member 34 is supported for rotation on the member 33 and is formed with the toothed portion 51. A third tubular shaped member 35 is mounted for rotation on the member 34 and is formed with a toothed portion 50.

A fluid drive member 17—C including the curved portion 27—A and the fluid vanes 31—A is rigidly mounted on the member 35 for rotation therewith. A second selective fluid drive member 17—B including the curved portion 27—B, opening 75 and the fluid drive vanes 31—B is rigidly mounted on the member 34 for rotation therewith. A third selective fluid drive member 17—A including the curved portion 27—C, opening 74 and the fluid drive vanes 31—C is rigidly mounted on the member 33 for rotation therewith.

A common fluid drive impeller member 15 including the curved portion 26 and the fluid drive vanes 30 is rigidly connected to the normally driving member 10 by means of the rivets 16 for rotation therewith.

The selective fluid drive control members 13 and 14 of Fig. 1 are loosely mounted for rotation on the bearing surface at the left hand end of the normally driven member 11 and are axially positioned by the member 33 and the portion 37 of the member 10. These fluid drive control members 13 and 14 of Figure 1 are preferably stamped or cast out of such material as cooper, brass or bronze. Member 13 is shown in plan elevation by Figure 4 as one piece of material. The plan view of member 14 is shown by Figure 5 as one piece of material.

All of the fluid drive elements 15, 17—A, 17—B and 17—C, fluid drive control members 13 and 14 and the tubular members 33, 34 and 35 are shown as mounted on the driving and driven members 10 and 11 for rotation about a common axis therewith. The bearings 20 and 21 in turn supporting the members 10 and 11 are supported and positioned by the casings 19—A and 29. The bearings are axially positioned by the end members 24 and 25 secured to the casings by means of the bolts 22. The casings are secured together by means of the bolts 45 in alignment by means of the portions 36 so as to provide a recessed space 73 for the free movement of the portions 68 and 69 of the fluid drive control members 13 and 14.

The parts of Figure 1 are so formed when assembled as to provide the space 59 between the curved portions 26, 27—A, 27—B, 27—C and the casings 19—A and 29.

The casing 19—A is formed with an enlarged portion 43 to strengthen the said casing at the bearing support portion and also with a bell shaped portion 19 arranged for attaching the mechanism to a vehicle or other supporting means. The casing portion 29 is formed with an axially extending portion 44 formed with the openings 42 to permit the installation and housing of the countershaft gear cluster 72 formed with the groups of teeth 46, 47, 48 and 49 constantly in mesh drive relation with the mating teeth groups 50, 51, 52 and 53. The axial extension 44 is also formed with an end portion 41 to receive and position the intermediate shaft 54 held in position by the cotter-pin 18. A cover 23 is held in position after the gasket 86 and the gear cluster 72 is in position by means of the screws 71.

For the purpose of this description, let it be assumed that all the fluid drive vanes 30, 31—A, 31—B and 31—C lie in planes passing through the common axis of the members 10 and 11.

Figure 4:
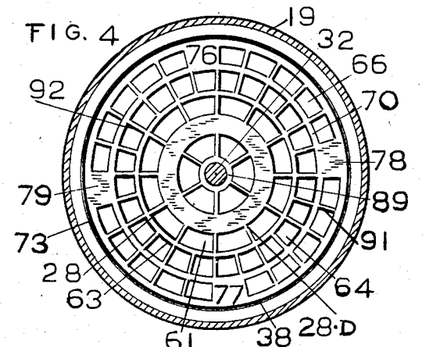
Figure 4 is a plan view in vertical elevation of the fluid drive control portions taken along the line 4—4 of Figure 1 looking in the direction indicated by the arrows.
Figure 5:
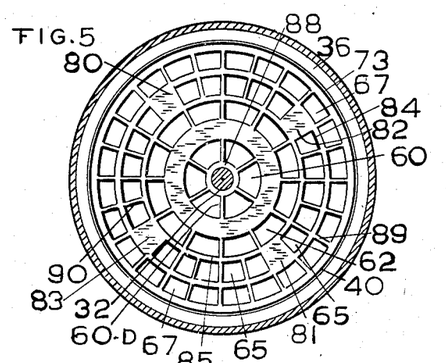
Figure 5 is a plan view in vertical elevation of another fluid drive control portion taken along the line 5—5 of Fig. 1 looking in the direction indicated by the arrows.

By means of Figures 1, 4 and 5 the fluid drive control disc shaped members 13 and 14 are shown loosely mounted for relative rotation in parallel planes about the common axis of the members 10 and 11.

The fluid drive control member 13 is formed with the fluid barrier portions 76—79, spokes 91, 92 and 28, webs 70 and 63 and the neutral fluid barrier portion 13. Thus the connecting spokes, webs, and barriers form the driving fluid openings 61, 64 and 66 as shown by Figure 4. The member 13 will be hereinafter referred to as the overspeed fluid drive control member.

The drive control disc shaped member 14 of Figure 5 is formed with the fluid barriers 80—83, connecting spokes 60, 89 and 90, webs 84 and 85 and the neutral fluid barrier portion 14. The fluid openings 62, 65 and 67 are formed as shown by Figure 5. The members 13 and 14 of Figure 1 are loosely mounted with the limited axial tolerance 40.

Figures 6, 7, 8, 12, 13, 14, 15, 17:
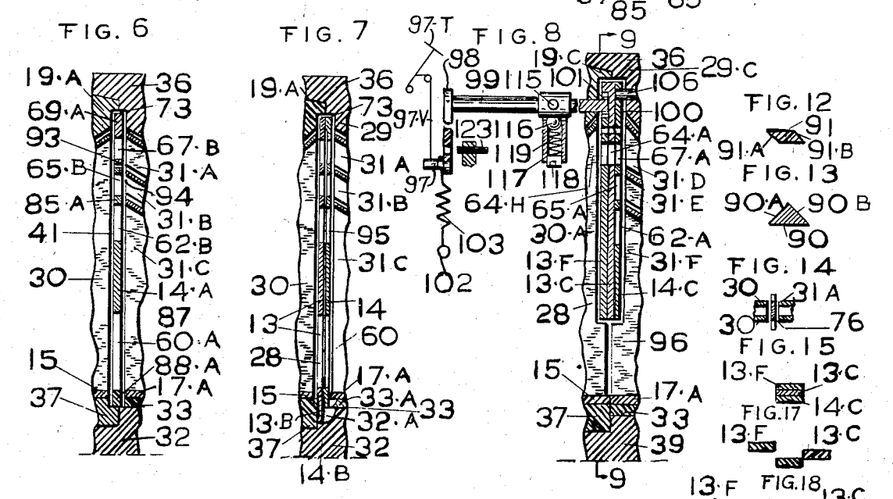

The means of Figure 6 constitute a modification of the fluid drive control members of Figures 1, 4 and 5 in which the fluid drive control members 93 and 94 are loosely mounted for relative movement in the same plane about the common axis of the members 10 and 11. Thus, the fluid drive control member 93 rotates outside of the drive control member 94 on the bearing surface provided by the recess 73 formed in the casings 19—A and 29 of Fig. 1. The fluid drive control member 94 is loosely mounted on the bearing surface provided by the end portion 32 of the member 11 and is axially positioned by the member 33 and the portion 37. The members 93 and 94 are spaced from the vanes 30, 31—A, 31—B and 31—C by the openings 41 and 87.

By the means of Figure 7 there is shown a modification of the two fluid drive portions 13 and 14 of Figure 1. In Figure 7 these members 13 and 14 are varied to include driving splines 13—B and 14—B. The member 13 is provided with splined fingers 13—B to operatively fit the driving splines 32—A formed in the portion 32 of the member 11. The fluid drive control member 14 is provided with splined fingers 14—B formed to fit the splines 33—A formed in the member 33.

In this event the member 13 will be positively drive related to the member 11 to rotate therewith. In the same manner the fluid drive control member 14 will rotate with the member 33.

By means of Figure 8 there is shown still another modification of the fluid drive control means 13 and 14 of Figure 1. In Figure 8 means are shown for holding the control member 14—C stationary with the casing 29 and thence rotatively shifting the operatively associated fluid drive control members 13—F and 13—C relative to each other and the member 14—C by manually actuated means working against the resilient means 103. The member 14—C is held stationary with the casing 29 by means of the pins 106. The member 13—C is provided with internal teeth 112 to receive the pinion 100 formed with the teeth 101. The member 13—F is formed with the teeth 111 also mating with the teeth of the pinion 100. The pinion 100 is preferably formed from the shaft 99 connected to the lever 98 provided with the handle 97 operatively connected to the spring 103 held by the support 102. The shaft 99 is positioned in a bearing support formed in the casing 19—A so as to properly position the pinion relative to the teeth 111 and 112 of the members 13—F and 13—C.

The handle 97 on the other end of the shaft 99 in one embodiment of the present disclosure is operatively connected to a conventional part of the vehicle such as the fuel throttle 97—T by means of the connection 97—U. In this event, the handle will be operated coincidentally in the normal operation of the vehicle upon which the device is installed and operated, or the handle may be manually operated from the vehicle dash as hereinafter described.

The disc shaped control member 14—C is formed with the openings 67—A, 65—A and 62—A (see Figure 8). The disc shaped fluid drive control member 13—C is formed with the openings 64—A, 64—B and 64—C, and the control member 13—F is formed with the openings 64—H, 64—I, 64—J and 104. All three fluid drive control members 13—F, 13—C and 14—C move about the common axis of the members 10 and 11 on bearing surfaces formed in a recess in turn formed in the casings 19—C and 29—C constituting modified casings of the portions 19—A and 29 of Figure 1.

Figures 15, 17 and 18 show the relative operative movements of the web or spoke portions of the members 13—F, 13—C and 14—C of Figure 8 to obtain approximate overspeed, direct or underspeed drive relations between the members 10 and 11 of Figure 1. When the member 10 is the driving member, the position of the webs is shown by the combination Figure 15 for overspeed drive relations, by Figure 17 for direct drive relations, and by Figure 18 for underspeed drive relations.

In the same manner, Figures 16, 19 and 20 show digrammatically the fluid drive control portions 105, 107, 108 and 109 of the fluid drive control members 13—F, 13—C and 14—C. The opening 104 of Figures 9, 10, 11 and 16 is preferably formed with inclined faces 105 and 108 as hereinafter described.

In operation, let it be assumed that the source of vehicle motive power (not shown) is connected to the normally driving member 10 of Figure 1 by means of the conventional foot clutch as commonly found on self-propelled vehicles, although it is possible according to the present disclosure to operate a vehicle equipped with the present device without a foot clutch.

Let it be further assumed, for the purpose of this description that the said source of power when connected to the member 10 will normally rotate the same clockwise when viewed from the left hand end of Figure 1. The device to be driven such as an automotive vehicle, is assumed to be connected to the normally driven shaft 11 through a conventional reversing unit (not shown) and that the shaft 11 is normally driven in the same direction as the shaft 10.

The transmission casing formed by the casings 19—A and 29 and associated parts is assumed to be well filled with a suitable drive fluid (not shown), and that this fluid is prevented from leaking out of the said enclosure so formed by the fluid retaining material 121 positioned in the recesses 122 formed in the end members 24 and 25 of Figure 1.

Thus, the fluid conducting paths formed by the fluid drive vanes 30, 31—A, 31—B and 31—C and the curved portions 26, 27—A, 27—B and 27—C will be well filled with the said driving fluid. The spaces surrounding the gearing of Figure 1 will also be surrounded with the said fluid.

It is obvious that all kinds of drive relations exist between the driving and driven members of a conventional self-propelled vehicle and also in conventional power transmitting mechanisms, but for the purpose of this disclosure, let it be assumed that the normal driving member 10 is rotating clockwise at constant speed.

For the normally driven member 11 to be rotating clockwise at the same speed as the member 10, it is obvious that there will be little or no torque impressed on the said driven member 11.

Let it also be assumed that the gear sets (53—49) and (51—47) are of the same speed drive, and thus the members 11 and 34 will rotate at the same speed, the member 33 will rotate faster than the member 11, and the member 35 will rotate slower than the member 11. For the members 10 and 11 to be rotating at the same speed with the member 10 driving, it is obvious that the fluid drive member 17—A will rotate faster than the members 10 and 11, the member 17—B will rotate at the same speed as the members 10 and 11, and the fluid drive member 17—C will rotate slower than the members 10 and 11. This condition will not be encountered in actual practice, and is assumed only for the purpose of this description. Now let it be assumed that a torque load is impressed on the member 11 to the extent that the speed of the member 11 is decreased below the speed of member 10.

In this event, a force resolving reaction will occur in the torque forces of the mechanism to cause the fluid drive vanes 31—A of member 17—C and associated fluid drive element parts to decrease their clockwise speed relative to the constant speed of the driving element vanes 30. The liquid pressure gradient in the fluid paths formed by the fluid conducting parts of the fluid drive member 15 will increase to become greater than the gradient produced in the member 17—C and thus a fluid pressure will exist to act to cause a fluid flow from the vanes 30 to the vanes 31—A through the openings 66 of the drive control portion 13, the openings 67 and the openings 75, 74, 60 and 28 of Figure 1.

In one embodiment, the inner sides of the spokes 91 of the portion 13 are formed at an angle with the plane of the paper upon which the Figure 4 is drawn as shown by face 91—A of Figure 12 and the spokes 89 of the portion 14 are streamlined or formed with sides at right angles to the said paper plane.

The flow of the fluid from the vanes 30 of the member 15 to the vanes 31—A of the member 17—C will react against the angular faces 91—A to cause the fluid drive control portion 13 to rotate about the common axis of the members 10 and 11 according to the inclination of the said faces as shown by Figure 12 wherein the said faces are shown parallel to each other. The fluid reactions against the connecting spoke 91 of Fig. 4 will not be the same as the reaction against the spoke 89.

With proper gear tooth arrangement of the cluster 72 the gear sets (50—46) (51—47) (52—48) and (53—49) may be so arranged that a small load torque impressed on the member 11 will cause the fluid drive couple (15) (17—C) and associated parts to fluid drive the member 11 faster clockwise than the member 10. This drive relation is commonly designated as overspeed drive in the automotiev field. With this gear set arrangement, the fluid couple (15) (17—B) will be driven faster clockwise than the member 10, and the fluid drive couple (15) (17—A) will be driven still faster than the couple (15) (17—B). This is the gear and fluid drive arrangement that will be considered for this description, altho it is obvious that many other gear and fluid drive arrangements could have been applied to the present disclosure without departing from the spirit of the invention.

For a relatively light overspeed torque impressed on the member 11 for this gear and fluid drive arrangement the driving fluid medium will flow clockwise (from vane 30 to vane 31—A) in the fluid drive couple (15) (17—C). For this same gear and fluid drive arrangement, it is obvious that the vanes 31—B will rotate clockwise faster than the vanes 30 and the fluid will flow counterclockwise from vanes 31—B to vanes 30. In the same manner the fluid drive medium will flow counterclockwise from the vanes 31—C to the vanes 30.

This is true, because the centrifugal force of the fluid drive medium in the fluid paths of the faster moving members 17—A and 17—B will be greater than in the similar radius paths of the member 15.

If the connecting spokes 91, 92 and 28 (see Fig. 1) of the drive control member 13 are formed with parallel oblique faces 91—A and 91—B as shown by Figure 12, fluid moving clockwise will tend to rotate the said member 13 in one direction and when moving counterclockwise will tend to rotate the member 13 in the opposite direction. For overspeed drive relations, the fluid in the paths of the fluid drive member 17—C moves clockwise as the fluid in the paths of the members 17—A and 17—B moves counterclockwise. It is obvious that the fluid of path 17—C will tend to oppose the rotational effort of the fluid of the paths 17—B and 17—A. The actual speed of the drive control member 13 will be in accordance with the resultant force, and will be very small because the resultant for overspeed drive relations will be very small in relation to the control force required as hereinafter described.

Now let it be assumed that the torque load impressed on the member 11 is increased. The clockwise speed of the member 11 and also the fluid drive couple member 17—C will decrease relative to the constant speed of the member 10, and the fluid pressure and thus the flow speed of the fluid driving medium from the vanes 30 to the vanes 31—C will correspondingly increase. At the same time the clockwise speed of the fluid drive couples (15) (17—B) and (15) (17—A) will decrease. The speeds of the members (15) (17—A) and (15) (17—B) will approach the speed of the member 10 and the drive pressures of the fluid in the paths of these members will decrease to the pressure in the vanes 30 at their radial distance. The action of the fluid in the paths of the members 17—A and 17—B against the faces of the member 13 will then decrease as the action of the fluid in the paths of the member 17—C increases.

The rotating pressure of the couple (15) (17—C) against the drive control faces of the member 13 will therefore increase as a function of the increase of load torque impressed on the member 11 as the opposition of the fluid in the paths 17—A and 17—B decreases. The fluid blocking portions of the member 13 will be rotated across the fluid paths of the members 15 and 17—C as a function of the torque load impressed on the member 11.

Figure 14 indicates the manner in which the fluid blocking action of the portions 76—79 of the control member 13 is obtained. The portions 76—79 are moved between the ends of the vanes 30 and 31—A to block the flow of fluid passing from one vane to the other. The flow of the fluid driving medium in each individual path formed by the vanes and segments of the said curved members of the fluid drive members 17—A, 17—B and 17—C will be sequentially and progressively blocked or interrupted by each of the barrier areas 76—79 of member 13 passing the openings 58 (see Figure 2) during a complete revolution of the member 13. The frequency of flow interruption will thus depend on the number of barriers, speed of member 13 and the speeds of the members 15 and 17—C.

It follows that the rate or frequency of the fluid flow interruption of the barrier portions 76—79 is also a function of the load torque impressed on the member 11.

Now let the impressed torque on the member 11 be further increased to the extent that the clockwise speed of the fluid drive member 17—B equals and thence falls below the clockwise speed of the driving member 10. The direction of fluid flow in the paths of the member 17—B will be reversed to act with the fluid in the paths of the member 17—C to rotate the member 13.

The directional flow of the driving fluid medium in the couple (15) (17—B) is thus reversed and will now flow clockwise through the openings 74, 28 and 60. The fluid in the paths of the members 17—C and 17—B now acts together against the faces of the member 13 and its rotational speed will now increase faster than the increase of torque impressed on the member 11. The rate of increase of rotation of the member thus automatically varies as a function of the difference in speed of the members 10 and 11.

All mass is subject to accepted laws of acceleration, and thus the mass of the driving fluid of the fluid drive couple (15) (17—C) is also subject to these laws. A time element is involved in the frequency of interruption of the motion (flow) of the said medium by the said barriers, and this time element is also a function of the difference in speed of the members 10 and 11 because the speed of the drive control member 13 is caused by the motion and/or pressure of the fluid medium.

The fluid in order to move has to accelerate from rest every time it is stopped by one of the barriers 76—79 and the extent of its movement or speed depends on the time it has to accelerate before it is stopped again by one of the said barriers. This action is in accordance with well known and accepted laws of acceleration of mass. When the frequency of fluid interruption is low there will be comparatively little interference to its flow by the barriers, but as the frequency increases the said interference will increase, and the flow of fluid in the paths will decrease as a function of the load torque impressed on the member 11.

With still further increase of the impressed load torque on the member 11, the fluid flow in the couple (15) (17—C) will begin to decrease due to the comparatively rapid increase of the fluid flow blocking action of the portions 76—79 of the member 13. At the same time, the clockwise flow of the driving fluid in the couple (15) (17—B) will increase as a function of the increase of the impressed torque.

The other connecting spokes 28 and 28—D (see Figure 4) may be formed with opposing faces 90—A and 90—B of Figure 13 if required for the conditions under which the device will be installed and operated. For the purpose of this description, it will be assumed that the spokes 28 and 28—D are streamlined in section, and that the spokes 91 and 92 are provided with faces operatively in opposite relation as hereinbefore described.

Now let it be assumed that the flow of the fluid in the paths of the overspeed fluid drive member 17—C is materially reduced, and that the flow of the fluid in the paths of the member 17—B is correspondingly increased.

The driving load will be automatically shifted from the fluid drive couple (15) (17—C) to the couple (15) (17—B) and from the gear sets (50—46) to the gear sets (51—47). This change will be gradual and micromatic as the torque load is increased. Eventually the speed-torque drive relations of the members 10 and 11 will be automatically changed from overspeed torque drive relations to approximately conventional direct drive relations. During the change the speed of the fluid drive member 17—A has been reduced clockwise to first equal and then pass the constant speed of the member 10 and the member 14 is being rotated to move the barrier portions (80—83). The fluid blocking action of the barrier portions of the member 14 will be very slight up to this time because the fluid driving medium in the paths of the members 17—A and 17—B have been moving in relatively opposite directions and thus the fluid actions against the control faces of the control member 14 have been in opposition.

However, as the member 17—C is now rotating at a less clockwise speed than the member 10, the direction of the fluid flow in the paths of the member 17—A is now reversed and the fluid in the paths of both members 17—A and 17—B are now co-operating to rotate the member 14.

Assume that the said torque load on the member 11 continues to increase. The clockwise speed of the fluid vanes 31—A of the member 17—C will continue to decrease and the difference in speed of the vanes 30 and 31—A of the fluid drive couple (15) (17—C) will continue to increase to greatly increase the speed of the member 13, still further increased by the increase in clockwise movement of the fluid moving in the paths of the member 17—B. The frequency of interruption of the fluid in the paths of the member 17—C will be so high that the fluid mass will not be able to accelerate to any great extent and the driving action of the couple (15) (17—C) will be very small compared to the driving action of the couple (15) (17—B). It should be noted that the blocking areas 76—79 of the member 13 have no effect on the fluid flow of the couple (15) (17—B) except to increase the fluid pressure between the fluid vanes 30 and 31—B by blocking the fluid flow between the vanes 30 and 31—A.

As the load torque has been increasing on the member 11 there has been little drive action of the fluid drive couple (15) (17—A) because the speeds of the vanes 30 and 31—C have been about the same. At first, the speed of the vanes 31—A was greater clockwise and then slower.

The fluid drive control member 14 is operatively associated with the fluid drive couple (15) (17—B) and is rotated according to the direction and pressure of the fluids of the members 17—A and 17—B as hereinbefore described. With the fluid driving medium of both members 17—B and 17—A flowing clockwise, the speed of the member 14 will be increased. The blocking action of the barrier portions (80—83) of the member 14 now begins to effect the flow of the fluid medium in the paths of the member 17—B. The clock-wise speed of the member 17—A has also decreased. Thus, the fluid flow in the paths of the member 17—B will begin to decrease as the fluid flow in the paths of the member 17—A increases.

The driving action of the couple (15) (17—B) continues to decrease as the driving action of the couple (15) (17—A) continues to increase with increase of impressed torque on the member 11. Eventually the driving action will be transferred from the gear set (47—51) to the gear set (48—52) and the drive relations between the members 10 and 11 will be changed from approximate conventional direct drive relations to underspeed drive relations.

The fluid drive member 15 cannot drive any of the selectively associated fluid drive members 17—A, 17—B and 17—C at a greater torque than is imparted to the said member 15 by the source of vehicle power, but the gearing including the gear sets of Fig. 1 when actuated by power from the fluid drive element 15 as hereinbefore described will convert torque in the well known and accepted manner of conventional mechanical torque changing devices. The torque selectively impressed on the member 11 by the gearing may be varied by the design of the said gearing to meet the peculiar requirements of the manner and the purpose for which the mechanism is installed and operated to overcome the load resistance of the member 11.

These changes in driving relation between the members 10 and 11 as just described have been sequential, progressive and micromatic and a function of the torque load impressed on the member 11. The said drive relation changes have been effected without jar or shock, and without valves, springs or cams. All of the relatively moving parts are constantly immersed in the fluid drive medium as a lubricant.

If the load torque impressed on the member 11 is now gradually decreased, the actions just described will be reversed. The clockwise speed of the member 11 will increase relative to the constant speed of the member 10. The clockwise speed of the fluid drive member 17—A will increase to approach and then pass the clockwise speed of the member 10, and the flow of the fluid in the paths of the member 17—A will reverse. Eventually the clockwise speed of the member 17—B will pass the speed of the member 10 and the directional flow of the fluid in the paths of the member 17—B will reverse to decrease the rotational speed of the control member 14.

The clockwise speed of the member 17—C will also increase to approach the speed of the member 10 and thus the speeds of both the members 13 and 14 will be decreased.

The driving action of the couple (15) (17—A) has decreased as its clockwise speed approached the closewise speed of the member 10 to shift the driving action from the gear set (52—48) to the gear set (51—47), and at this time the members 10 and 11 are again in approximate conventional direct drive relation. As the impressed load torque on the member 11 continued to decrease the clockwise speed of the fluid driving member 17—B increased, the clockwise speed of the fluid driving member 17—B increased to approach and thence pass the speed of the member 10. The directional flow of the fluid in the paths of the member 17—B will reverse and the rotational speed of the control member 14 will decrease so that its resultant speed will in turn be a resultant of the actions of the now opposing fluid portions of the members 17—B and 17—A. Eventually the fluid drive action of the member 17—B will be shifted from the gear set (51—47) to the gear set (50—46) and the members 10 and 11 will now be in approximate conventional overspeed drive relation. During this time the speed of the member 13 has decreased to the extent that the barrier action of the portions (76—79) is of little effect.

Now let it be assumed that the member 11 becomes the driving member and that the member 11 is rotating clockwise when viewed from the left hand end of Figure 1. Let it be further assumed that the load torque on the member 10 is at a minimum. With the particular sets of speed drive gearing arrangement shown by Figure 1 for the purpose of this description it is obvious that the vanes 31—c will be rotated clockwise faster than the driving member 11 and the vanes 31—B. The vanes 31—B will be rotating clockwise faster than the vanes 31—A. In actual practice, the relative speeds of the vanes 31—A, 31—B and 31—C will depend on the tooth ratios of the gear sets of Figure 1.

In any event the speed relations of the said three impeller fluid drive vanes 31—A, 31—B and 31—C will be determined by the speed relation of the said gear sets. According to this particular embodiment, it is contemplated that all three of the impeller portions of the fluid drive paths will cooperate to conduct fluid to drive the impeller portions 30 and thus member 10 at about the constant speed of the now driving member 11. One set of vanes as 31—A may be slower than the member 11 and another set as 31—C faster than the member 11, but the average speed of the said three sets of vanes will be about the same as the speed of the member 11. Especially will this be true with the minimum load torque impressed on the now driven member 10.

As the load torque on the now driving member 10 is increased, the clockwise speed of the member 11 will normally decrease, but if the constant speed of the member 11 is maintained the speed relations of the said three sets of vanes 31—A, 31—B and 31—C will not vary. The speed difference of the vanes of the fluid drive couple (15) (17—C) will increase to rotate the fluid drive control member 13.

It should be noted at this time that the fluid paths of the members 17—A, 17—C and 17—B are of different radial length and that this status may cause the member with the longer radial path to transmit more power at slower speed than a member with shorter radial length at higher speed.

As the torque load on the now driven member 10 is further increased, the speed of the member 10 will normally still further decrease. With the member 11 still rotating at the said constant speed, the speed difference of the vanes 30 and 31—A will increase to increase the fluid pressure and motion and thus the speed of the member 13 to the extent that the barrier portions 76—79 will begin to affect the flow of fluid from the paths of the fluid drive member 17—C to the member 15 because the path portions of the fluid flowing between the vanes 31—A will be stopped by the barrier portions 76—79 at a greater frequency so that the time interval for acceleration between stoppages will be decreased and thus the driving effect of the fluid flow from the impeller 17—C to runner vane paths (see 30) will decrease. At the same time, the vanes 30 and 31—B have acquired a difference of speed to also produce a fluid pressure with the fluid motion also increasing the speed of the member 13. Thus with an increase in impressed torque on the now driven member 10 there will be a change in the relative speeds of all the vanes of Figure 1. The greatest change will take place between the vanes 30 and 31—A, the next greatest change will take place between the vanes 30 and 31—B and the smallest change will take place between the vanes 30 and 31—C. Because of this action, the greatest blocking action will take place in the fluid of the couple (15) (17—C), and the driving load will be shifted to the fluid drive couple (15) (17—B) and from the gear set (46—50) to the gear set (47—51) to change the driving relations of the members 10 and 11 to a slight overspeed drive relation. The co-operative drive action of the three impeller fluid drive members 17—A, 17—B and 17—C as hereinbefore described for this particular embodiment will cause approximate conventional direct drive relations for a comparatively wide torque range of increase. The shifting of the load from the gear set (50—46) to the gear set (51—46) will normally cause the member 10 to tend to approach the speed of the member 11 and as the load is finally shifted from the gear set (51—47) to the gear set (50—46) the member 10 may be driven at a slight overspeed relative to the speed of the driving member 10.

The actual amount of overspeed increase will depend on the gearing of Figure 1. In actual operation of the device as installed on a vehicle, this condition of the member 11 acting as the driving member of the mechanism will normally take place as the vehicle is moving down grade. With increase in speed of the vehicle, the speed of the member 11 would increase and not remain constant as was originally assumed for the purpose of this description.

With increase in speed of the member 11, there would be an increase in speed difference between the vanes of Figure 1, and a variation in the division of power transmitted to the member 10. The division of power between the three fluid drive members 17—A, 17—B and 17—C will of course depend on the peculiar requirements encountered on the device upon which the mechanism will be installed and operated. The areas of the fluid drive paths may be varied, the length of the paths may be varied and the gear sets may be varied. According to the present disclosure it is contemplated that the fluid drive couple (15) (17—A) will be employed so as to assume the greater fluid drive action as the load impressed on the member 10 is increased as the speed of the member 11 is increased. It is possible to cause the member 10 to be driven overspeed at a greater clockwise speed than the now driving member 11 as the speed of the member 11 increases. In fact, the overspeed increase of the member 10 may be at a greater rate than the increase in speed of the member 11, so that approximately conventional overspeed may be automatically effected between the members 10 and 11 as the said vehicle accelerates beyond a predetermined speed.

The fluid drive action of the means of Figures 1, 2, 3, 4 and 5 may thus be employed so as to automatically tend to limit the acceleration of the said vehicle when the member 11 is the driving member.

The fluid drive control members 13 and 14 of Figures 1, 4 and 5 are shown spaced apart in parallel planes at a distance indicated by the numeral 95, and with the spokes 28—D and 60—D in the path of the fluid flowing from the paths of all three fluid drive members 27—A, 27—C and 27—B.

According to the fluid drive control member arrangement of Figure 6 there will only be one set of spokes 60—D in the path of the portions of this fluid. The drive control members 93 and 94 are not in contact at any point and the control member 93 has no operating relation to the fluid drive members 17—A and 17—B. In the same manner the fluid drive control member 94 has no operative relation with the fluid drive member 17—C.

The fluid control relations of the fluid openings in the control members 93 and 94 and the blocking portions may be seen by superimposing Figure 4 upon Figure 5. The barrier portions 76—79 and 80—83 will have similar positions on the members 93 and 94.

The openings 67—B of member 93 correspond to the openings 66 of member 13, and the openings 62—B and 65—B correspond to the openings 62 and 65 of member 14 of Figure 1.

The member 93 rotates on the bearing portion 69—A formed in the recess 73 of the casings 19—A and 29.

The fluid drive control member 94 rotates on the bearing portion 88—A supported on the surfaces of the members 37 and 32. The member 94 has a slight freedom of axial movement as determined by the space between the members 33 and 37.

By means of the fluid drive members 93 and 94 a fluid barrier action will be obtained by reference to only one of the fluid drive members 17—B and 17—C. The fluid drive control member 93 will only be affected by the action of the fluid flowing in the paths of the member 17—C. In the same manner the member 94 will have no operating connection with the fluid flowing in the paths of the member 17—C. According to this method of providing the fluid drive control members 93 and 94, there will be no hunting action or overlapping action of the fluids in the various paths. Member 93 will at all times respond to the fluid motion of the member 17—C and in definate relation to such motion. The efficiency of the mechanism as a unit compared to the embodiment shown by Figure 1 will be slightly increased because only one set of cammed surfaces will be in the path of any portion of the said fluid drive medium.

By means of Figure 7 there is shown means for positively rotating the fluid drive control members 13 and 14 of Figure 1 at speeds relative to the speeds of other portions of Figure 1. This is accomplished by providing the member 13 with the splined fingers (see Figure 7) 13—B formed so as to operatively fit the splines 32—A formed on the member 33. Thus, the member 13 will now positively rotate at the speed of the member 11, or the speed of any other portion of Figure 1 that it may be splined to.

Member 14 is provided with fingers 14—B to fit the splines 33—A on the member 33 to rotate therewith. The barrier portions of members 13 and 14 of Figure 7 are shown by Figures 4 and 5.

With this arrangement, the members 13 and 14 of Fig. 1 are actuated by power from the member 11 driven by power transmitted from member 10 through the fluid. With member 11 driving the members 13 and 14 of Fig. 7 will be rotated directly from the power source.

With the member 10 driving and the member 11 at rest because of a relatively high load torque, the control members 13 and 14 will also be at rest because they are splined to the member 11. With the member 10 rotating at maximum speed, the blocking or interrupting speed of the members 13 and 14 will be at a maximum because the fluid in the individual paths of the member 15 will be moved across the interrupting paths (76—79) and (80—83). Thus the fluid drive action will be quickly and automatically shifted to the fluid drive member 17—B and thence to member 17—A as hereinbefore described. If the couple (15) (17—A) cannot move the member 11 against its load torque, the mechanism will be stalled. If the impressed load can be overcome, the member 11 will be rotated clockwise and the members 10 and 11 will be in approximate conventional low speed drive relation as hereinbefore described.

When the fluid medium flowing in the individual paths of the member 15 is interrupter by the barrier portions of members 13 and 14, the fluid is blocked by one of the barrier portions (76—79) and (80—83) of Figures 1, 4, 7 or 5 and also the portions of members 93 and 94 of Figure 6. After a given flow-interruption, the fluid in the interrupted path starts to flow again due to the impressed pressure. The time interval before the said fluid is interrupted again, will determine the extent of its acceleration for the said impressed pressure. With the proper amount of fluid in the enclosure formed by the casings 19—A and 29, and with the pumping action of the member 15 creating a potential or pressure in the fluid of its paths, the pressure on the left hand side will be greater than the pressure on the opposite side. If the mechanism of Figure 1 is positioned so that the common axis of the members is vertical with the member 15 on top there will be little or no fluid pressure on the said opposite side of the said barriers, especially if the member 11 is at rest. If the said common axis is in a horizontal plane, the fluid of the members 17—A, 17—B and 17—C will tend to move to the bottom of the said members, especially if the member 11 is at rest, but normally the pressure on the right hand side of the barriers will be less than the pressure on the left hand side. When the fluid in the said individual paths is interrupted at a proper frequency, the interrupted fluid cannot accelerate to impress the same axial force to the right as it is exerting to the left. There will be a resultant axial force to the left tending to move the mechanism of Figure 1 to the left of the sheet upon which it is drawn. If a third set of barriers (not shown) is added to block the flow of fluid in the paths of member 17—A are added the said resultant axial force will be increased. This is true, because the fluid pressure against any individual barrier normally will not exceed the pressure of a fluid path as shown by Figure 14, and there are more fluid paths than barriers. The said resultant axial force to the left will increase with increase of barrier interruption rate or frequency for a given set of conditions for the means of Figure 1, and with the member 11 driving as hereinbefore described, the said resultant force will be to the right of Figure 1.

As the torque load on the member 11 continues to decrease its clockwise speed and the speed of the members 13—A, 13—B, 13—C, 13 and 14 will normally increase. As the load continues to decrease the blocking action of the areas (76—79) and (80—83) will decrease as the speed of the member continues to increase clockwise. The resultant axial force to the left will also decrease.

Let it be assumed that the torque load on the member 11 is now increased with the member 10 still driving at constant speed. The operating conditions just described will be reversed and as the torque is increased the load will be automatically shifted to the fluid drive couple (15) (17—B) and thence to the couple (15) (17—C) and an underspeed drive relation will be effected between the members 10 and 11.

When the normally driving member 10 becomes the driven member as the vehicles drive the member 11 with the modification of Figure 7 the fluid drive control members 13 and 14 of Figure 7 will be positively driven at the speeds of the members 32 and 33.

The member 14 will be driven clockwise faster than the member 13 which will rotate at the speed of the member 11. As the ratios of the gear sets (53—49) and (51—47) are assumed to be the same for the purpose of this description, it is obvious that the fluid drive control member 13 of Figure 7 will rotate at the speed of the fluid drive member 17—A and thus at the speed of the vanes 31—C.

There will be comparatively little fluid blocking action by the barrier portions of the members 13 and 14 of Figure 7 when the member 11 of Figure 1 is the driving member. All three fluid drive members 17—A, 17—B and 17—C will combine to drive the member 10 at approximately the speed of the member 11, and approximate direct drive relations will normally be effected between the members 10 and 11.

However, as hereinbefore stated, the means of Figures 1 and 7 may be varied to cause the now driven member 10 to increase in speed faster than the member 11. In this event, unless there is sufficient power available, the member 11 (and the vehicle) will be automatically held to a predetermined speed.

By means of Figure 8 there is shown still another modification of the means of Figure 1 for employing the pressure and/or the motion of the fluid driving medium so as to automatically and/or manually effect and affect the proper speed-torque drive relation between the members 10 and 11 of Figure 1.

Figures 9, 10, 11:
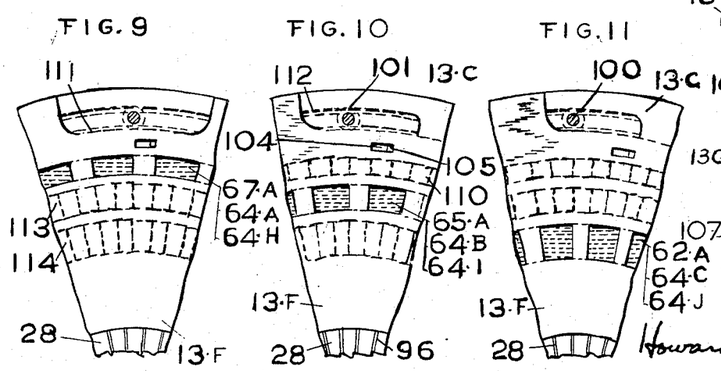
Figure 9 is a view in vertical plan elevation of a portion of the fluid drive control elements of the modification of Fig. 8 taken above the axis of the main shaft along the line 9—9 showing relative positions of the said elements for causing approximate conventional low speed drive relations between the driving and driven members of Figure 1.
Figure 10 is a view in vertical plan elevation of a portion of the fluid drive control elements of the modification of Fig. 8 taken above the axis of the main shaft along the line 9—9 showing relative positions of the said control elements for causing approximate conventional intermediate or direct drive relations between the driving and driven members of Figure 1.
Figure 11 is a view in vertical plan elevation of a portion of the fluid drive control elements of the modification of Fig. 8 taken along the line 9—9 showing relative operating positions of the said control elements for obtaining approximate conventional overspeed drive relations of the driving and driven members of Figure 1.

A member 14—C is substituted for the member 14 of Figures 1, 5 and 7. The member 14—C is held stationary by means of the pin 106 securely fixed in the casing 29—C. This member 14—C is formed with fluid openings 67—A, 65—A and 62—A as shown by means of Figures 9, 10 and 11. The member 13—C is substituted for the member 13 of Figure 1 and is provided with fluid openings 64—A, 64—B and 64—C as shown by Figures 9, 10 and 11.

A third fluid drive control member 14—F is added. The member 13—F is formed with the openings 64—H, 64—I and 64—J. The members 13—F and 13—C are rotatably mounted on the bearing surface formed in the recess (as 73 of Figure 7) provided with the bolting of the casings 19—C and 29—C of Figure 8. The drive control member 13—C is formed with the internal teeth 112 and the member 13—F is formed with the teeth 111. The shaft 99 is rotatably supported in an opening in the casing 19—A and formed on one end with the pinion teeth 101 at the portion 100 to mate with the teeth 111 and 112 of the members 13—F and 13—C. The relative rotational freedom of the members 13—F and 13—C is sufficient to bring certain groups of the fluid openings into axial alignment as shown by Figures 9, 10 and 11. In Figure 9 the groups of openings 67—A, 64—A and 64—H are in axial alignment to effect normal overspeed drive relations between the members 10 and 11. In Fig. 10 the fluid openings 65A, 64—B and 64—I are in line to effect approximate conventional direct drive relations between the members 10 and 11. In Figure 11 the fluid openings 62—A, 64—C and 64—J are in line to effect approximate underspeed drive relations between the said members.

When the member 10 is the normal driving member with the modifications of Figure 8 with a light load torque impressed on the member 11, the fluid drive members 31—D, 31—E and 31—F will be rotating at relative speeds determined by the gearing of Figure 1. The fluid drive control members will be in the positions as shown by Figure 9 with the openings 67—A, 64—A and 64—H in line. Fluid will move through the openings of Figure 9 from the vanes 30—A to the vanes 31—D. Fluid will also pass through the opening 104 (see Fig. 10) and against the inclined face 105 (see Fig. 16—b) formed in the member 13—F. Normally the pressure gradient created in the fluid medium for overspeed drive relations is not sufficient to rotate the members 13—F and 13—C in opposite directions by means of the pinion teeth 101, 111 and 112. According to the present disclosure there are three speed bands in the normal operation of the members 10 and 11. These bands are designated as overspeed, direct and underspeed. Each cover approximately one-third of the possible speed-torque driving range between the members 10 and 11.

The shaft 99 is formed with a lever 98 to which is secured the handle 97. The handle is formed to receive the spring 103 fastened at one end by the support 102. With this arrangement, it is obvious that sufficient fluid pressure must be exerted against the drive control face (or faces) 105 to move the member 13—F clockwise and the member 13—C counterclockwise, the shaft 99, crank 98 and handle 97 counterclockwise against the resistance of the spring 103 to move the openings 67—A, 64—A and 64—H out of line as shown by Figure 9. The fluid movement and/or pressure against the face 105 is a function of the load torque on the member 11 as hereinbefore described. This pressure and motion is also a function of the difference in speed of the members 10 and 11. Let it be assumed that any pressure and/or fluid motion not sufficient to move the openings out of the line relation of Fig. 9 is in the overspeed band. The opening 104 and face 105 will take the position (a) of Figure 16 for the overspeed band. The openings of the members 13—F, 13—C and 14—C will take the positions (a) (b) and (c) of Figure 15 for the overspeed band.

The shaft portion 99 and the pinion portion 100 may be connected by conventional back gearing (not shown) to cause any required relative motion between the spring member 103 and the pinion teeth 101.

As the impressed torque on the member 11 is increased to the said direct torque band, the speed of the member 11 will normally decrease relative to the assumed constant speed of the driving member 10. The clockwise speeds of the members including the fluid vanes 31—D, 31—E and 31—F will also decrease. This will increase the fluid pressure on the fluid drive control face 105 to move the member 13—F clockwise and the member 13—C counterclockwise against the resistance of the spring 103 to the positions shown by Figure 10. This action will move the openings 67—A, 64—A and 64—H out of line (see Fig. 9) and the openings 65—A, 64—B and 64—I into line as shown by Fig. 10. The fluid flow will be stopped between the vanes 30—A and 31—D and permit fluid to flow from vanes 30—A to vanes 31—E. Thus the drive action of the fluid will be transferred from the gear set (46—50) to the gear set (47—51) and approximate direct drive relations will be effected between the members 10 and 11. The opening 104 and the face 105 will now be at the position (b) of Figure 15. Any number of openings 104 with angular faces 105 and 108 may be formed in the member 13—F and/or 13—C to secure sufficient torque from the fluid medium to rotate the members 13—F and 13—C to a desired angular relation as a function of the load torque impressed on the member 11. The spring 103 will therefore be microenergized to balance the shaft and associated parts against the fluid torque. When this balance is near the line between the speed-torque bands the said micromatic control action may cause a hunting action in the mechanism as the impressed torque swings back and forth across the band line. This action may be desired in some embodiments of the mechanism. When micromatic control action is not desired, the shaft 99 is formed with the detents 115 to receive the detent ball 116 positioned in the casing 117 against the pressure of the spring 119 adjusted by the nut 118. In this event, the fluid torque on the face 105 will have to move the ball 116 out of a detent 115 to move the shaft from one detent position to another.

With this arrangement there will be a definite step from one drive band to another.

As the openings were shifted from the position of Figure 9 to the position of Figure 10, the connecting spokes of the members 13—F, 13—C and 14—C moved to the relation shown by position (b) (a) (c) of Figure 15 to form an approximately closed wall to the passage of the fluid medium (see Figure 10). The relation of these closed walls is shown by the numerals 110, 113 and 114 of Figures 9, 10 and 11.

As the impressed torque on the member 11 is still further increased, the clockwise speeds of the vanes 31—D, 31—E and 31—F will be still further decreased and the fluid pressure and/or motion against the face 105 will be increased to move the members 13—F and 13—C to the positions shown by Figure 11. The openings 65—A, 64—B and 64—I will be moved out of line, and the openings 62—A 64—C and 64—J will be moved into line. The spring 103 will be further energized to the underspeed drive band position as the shaft 99 is rotated to move the detent ball 116 out of one detent position into the underspeed detent position. The flow of fluid from the vanes 30—A and 31—E will be stopped and fluid will now flow from the vanes 30—A to the vanes 31—F. The fluid drive action will be transferred from the gear set (51—47) to the underspeed gear set (52—48) and the member 10 will drive the member 11 at approximately underspeed drive relation. The drive control face 105 will be moved to the position shown at (c) of Figure 16.

As the impressed load torque on the member 11 now decreases its clockwise speed will normally increase. The clockwise speed of the fluid drive vanes 31—D, 31—E and 31—F and associated portions will also increase clockwise. The fluid pressure and/or motion impressed on the fluid drive control face 105 will decrease and the spring 103 will act through the handle 97, lever 98, shaft 99 and pinion 100 to move the members 13—F and 13—C to a spring-fluid balanced position as a function of the new torque load on the member 11. If the decrease is sufficient, the fluid pressure decrease on the drive control face 105 will be sufficient to permit the spring 103 to move the detent ball 116 out of the detent 115 in the next band detent. The openings 62—A, 64—C and 64—J of Figure 11 will be moved out of line and the openings 65—A, 64—B and 64—I will be moved into line as shown by Figure 10. The driving action will be transferred from the gear set (53—49) to the gear set (52—48) and the member 10 will drive the member 11 at approximately direct drive speed relations.

Still further decrease in load torque on the member 11 will cause the spring 103 to move the members 13—F and 13—C to the position shown by Figure 9 with the resulting actions on the detent ball and openings as hereinbefore described. The members will then be in the overspeed band relation because the fluid drive medium will again be flowing from the vanes 30—A to the vanes 31—D.

When the member 11 becomes the driving member with the modification shown by Figure 8 the flow of fluid against the faces will reverse and the face 108 (see Figure 16) will receive the fluid pressure and/or movement to move the members 13—F and 13—C so as to rotate the shaft 99 clockwise as viewed from the left hand end of Figure 8. The extent of the fluid action against the drive control face 108 will depend on the area and angle of the face 108 and the type of fluid employed for a given set of means of Figure 1. For the purpose of this description the faces 105 and 108 are not parallel. Then the same fluid pressure on the face 105 would not have the same effect on the face 108. It should be noted at this point that the fluid drive control members 13—F, 13—c and 14—C of Figure 8 may be varied in form relative to each other and to the portions of Figure 1 in order to meet the peculiar requirements under which the device will be installed and operated.

For example, if the planes of the faces 105 and 108 of Figure 16 are rotated about an axis 90 degrees then the same fluid pressure will move the members 13—F and 13—C in the opposite direction from that taken before the rotation The faces may be so arranged on the member 13—F (and also 13—C) so that an increase in the impressed torque load on the member 10 may cause the drive control members 13—F and 13—C to tend to move "up." That is, the mechanism of members 1 and 8 may move from direct drive relations between the members 10 and 11 to overspeed drive relations with increase of torque load. Unless the source of power could maintain the assumed constant speed, it is obvious that the mechanism would be stalled, but such operation is possible in most conventional devices, and according to the present disclosure.

Normally the spring 103 is inactive for overspeed range driving as shown by Figure 8. This spring 103 will be equally energized by equal movements of the members 13—F and 13—C in either direction.

When the member 11 is driving the member 10 against engine compression, it will be possible to so relate the portions of Figure 8 as to cause increasing overspeed drive relations between the members 10 and 11 as the speed of the member 11 is increased.

According to the present disclosure, it is contemplated that the handle 97 will be actuated manually as a co-incidental function of the normal operation of the said vehicle, or the handle 97 may supersede the automatic action of the fluid drive medium as hereinbefore described. The handle may also be actuated independently of the operation of the vehicle or the fluid.

When the handle 97 is mechanically operated as hereinbefore described or manually operated from the position shown by Figure 8 in either rotational direction, the shaft 99 will be correspondingly rotated to rotate the pinion 100 and thereby the fluid drive control members 13—F and 13—C. The handle will be moved against the combined resistance of the springs 103 and 119.

Normally the openings 67—A, 64—A and 64—H are in line axially as shown by Figure 9. When the crank 98 is turned (say) counter-clockwise as viewed from the left hand end of Figure 8, the pinion 100 will be rotated counterclockwise to move the members 13—F and 13—C so that the openings 67—A, 64—A and 64—H out of line as shown by Figure 9 and the openings 65—A, 64—B and 64—J into line as shown by Figure 10. The fluid flow will be shifted as hereinbefore described for the automatic operation. As the handle is rotated any speed drive relation between the members 10 and 11 may be manually selected whether either of the said members is the driving member.

The handle 97 may be moved to a selected speed position and set by the stop 123 so that the fluid openings of the Figures 9, 10 and 11 will stay in line until manually changed. Or the handle 97 may be moved to a selected speed position when the detent ball 116 will move into the selected detent. However, if the stop 123 is not moved into place to hold the handle against rotary movement, fluid action acting on the faces 105 or 108 as hereinbefore described will increase with an increase of torque on the driving member to supersede the manual selection to automatically move the handle to another position. When the pin 123 is in the hole in the crank 98, the fluid cannot supersede the manual selection. It should be noted that the lever 98 can be manually moved so as to rotate in either direction without regard as to which of the members 10 and 11 is the driving member. That the lever 98 may be set at any of the detent positions without regard to the driving relations of the said members, and also that the handle may be manually held to aid or oppose the action of the fluid on the drive control faces 105 and 108.

In conclusion, it will be understood that the present invention provides means for automatically effecting and affecting fluid speed drive relations between driving and driven members as a function of the difference in speed of the said members. That means are provided for employing a small portion of the fluid drive medium of a fluid drive mechanism positioned between two power transmitting members to automatically control the manner in which the fluid will be employed to transmit power from one of the said members to the other.

That fluid power transmitting means are provided to automatically vary speed-torque drive relations between elements of a fluid drive power transmission device.

That means are provided whereby pressure and/or movement of a fluid drive medium are selectively employed to cause the fluid transmission of power between rotors in a selective manner.

That means are provided for superseding the automatic fluid medium selection of speed-torque drive relations between driving and driven power members by remotely positioned control means.

That means are provided whereby fluid controlled means and manually actuated means may co-operate to selectively control the speed-torque drive relations of drive and driven members.

While I have shown and described and have pointed out in the annexed claims certain new and novel features of my invention, it will be understood that certain well known equivalents of the elements illustrated may be used, and that various other substitutions, omissions and changes in the form and details of the devices illustrated and in their operation may be made by those skilled in the art without departing from the spirit of my invention. For example, the fluid openings shown by Figures 9, 10 and 11 may be provided by relative radial motion of parts instead of by relative rotary motion as shown.

Having thus described my invention, I claim:

1. A torque converting device comprising a pair of power members, a fluid, a plurality of speed drive sets drive connected to one of the members, nestled fluid runner elements each connected to one of the said speed sets, a fluid drive impeller element in fluid drive relation with the said runner elements and drive connected to the other power member, and perforated disc shaped members actuated by certain of the said runner elements, said discs positioned one after the other between the said impeller and said runner elements and in the path of the said fluid.

2. In a device of the class described, the combination including a driving member and a driven member, a fluid, a plurality of unlike speed sets drive connected to the driven member, a plurality of nestled fluid runner elements, means for drive connecting a runner element to a speed set, an impeller element drive connected to the driven member and arranged in common fluid drive relation with the runner elements, and a plurality of disc shaped drive control members drive connected to certain of the runner elements and provided with blocking surfaces for opposing the flow of the said fluid from and to the impeller element and certain of the runner elements in accordance with the relative speed of the driving and driven members.

3. In a device of the class described, the combination including a driving member and a driven member, a fluid, a plurality of unlike speed sets drive connected to a common drive member in turn drive connected to the driven member, a plurality of unlike nestled runner elements, each of said runner elements provided with means for drive connecting same to one of the said speed sets, an impeller element drive connected to the driving member and positioned relative to the said runner elements so as to be in universal fluid drive relation with each of the said runners, and unlike disc shaped drive control members drive connected to certain of the said runner elements and actuated through the said fluid from the said driving member, said disc members formed with unlike openings and cammed surfaces for both increasing the fluid flow from the impeller to one of the runners and decreasing the fluid flow to another runner element.

4. In a device of the class described, the combination of a fluid medium, a driving member, a driven member and an automatic fluid torque converting mechanism positioned therebetween, said mechanism including an impeller element drive related to the said driving member and constituting a common portion of a path for the said medium, a plurality of nestled runner elements collectively and individually constituting other portions of the said path, a plurality of speed sets each drive connected to one of the runner elements, all speed sets drive related to the driven member, and drive control members forming portions of the fluid path and each drive related to a runner element, said drive control members with radial groups of fluid openings with cammed sides and a less number of fluid barrier portions, said openings and said barriers in the path of the said fluid, said cammed sides tending to aid or oppose the flow of the said fluid in accordance with a difference in speed between the said impeller element and each of the said runners.

5. In a device of the class described, the combination of a drive member, a driven member, fluid, gearing including a plurality of unlike speed drive sets, a common fluid drive impeller element drive connected to the said drive member, a plurality of fluid drive portions normally acting as fluid runner elements each drive connected to a different drive set and in fluid drive relation with the said common element, means for drive connecting the said sets to the driven member, and a plurality of fluid drive control members positioned for rotation about a common axis in the path of the said fluid and between the said common element and the said runner elements, each of the said speed drive members drive connected to a runner element, said control members formed with cammed openings shaped to drive and be driven by the said fluid, said control members also formed with barrier portions shaped to impede the flow of certain portions of the said fluid thereby to vary the drive relations of the said runner elements and the said common element.

6. In an automobile fluid drive control mechanism, the combination including a pair of power members and torque converting means therebetween, constituting a plurality of portions of a closed fluid path and a fluid for the said path, one of the said portions including an impeller element drive connected to the driving power member, a plurality of nestled runner path portion elements in parallel relation to each other and in series relation with the said impeller portion, a plurality of speed drive sets each drive connected to the said driven member and to one of the said runners, and a plurality of unlike control means also forming portions of the said fluid path and positioned for separate rotation therebetween the said impeller and the said runners, said control means formed with fluid openings having cammed sides positioned so as to act and be acted on by the said fluid thereby to affect the drive action of certain portions of the fluid in the paths formed by the said runners.

7. In a device of the class described, the combination including driving and driven power members, fluid drive means for automatically maintaining a speed-torque drive relation between the said members in accordance with the drive relations of portions of the said fluid drive means, fluid, a plurality of speed drive sets drive connected to the said driving member, a plurality of runner elements each drive connected to one of the said sets and a common fluid impeller element drive connected to the said driving member, a plurality of automatic speed-torque changing drive control members positioned in the path of portions of the said fluid, said members actuated by the passage of portions of the said fluid through cammed openings formed with the said control members, and remotely positioned manually actuated control means operatively connected to the said control members to operate the said control members independently of the action of the said fluid.

8. In a fluid drive control means, the combination of drive and driven power members, a fluid, and a torque responsive fluid drive control means therebetween, said means including a plurality of speed drive sets drive connected to the said driven member, nestled runner elements respectively drive connected to the said speed sets and an impeller element drive connected to the said drive member, and fluid drive control means each connected to a different speed set and positioned between the said impeller and runner elements, said control means actuated by portions of the said fluid so as to individually and collectively affect and effect the flow of all the fluid portions through the said runners so as to cause certain of the said runners to actuate the said fluid.

9. In a drive control means, the combination including a fluid, a pair of power members and a torque responsive coupling in slip-drive relation about a common axis, said coupling including nestled elements normally acting as runners each in different speed drive relation with the driven member and a common impeller element in drive relation with the driving member, and a plurality of fluid drive control members in the path of the fluid and each in different speed drive relation with the driven member, said control members actuated by the fluid to individually vary the fluid drive action of portions of the said fluid on the runner elements and thus cause the said runners to individually and collectively drive the driven member.

10. A torque converting device comprising a pair of power members, a fluid, nestled fluid drive elements normally acting as fluid impeller elements and each differently speed drive connected to the driving member, a fluid drive runner element in drive relation with the said impeller elements and drive related to the driven member, and unlike perforated disc shaped drive control members each separately speed drive connected to the driving member and positioned between the said runner and impeller elements, said control elements formed with cammed portions in the path of the said fluid.

11. A torque converting device including a pair of power members, a fluid, nestled fluid drive elements each separately speed drive connected to one of the said members, a single fluid drive element in drive relation to the other said member, fluid drive control members positioned between said nestled elements and the said single element, and remotely positioned manually actuated control means operatively connected to the said drive control means for selectively varying the fluid drive relations of the said nestled elements and the said single element individually and collectively and thereby the fluid drive relations of the said power members.

12. In a device of the class described, the combination including a driving member and a driven member, a fluid, nestled fluid impeller elements unlike speed drive connected to the driving member, a single runner element drive connected to the said driven member, and fluid drive control members positioned in the path of certain portions of the said fluid and between the said single element and the said nestled elements, said control members respectively speed drive connected to the said driving member and formed with spaced apart drive control fluid openings.

13. In a device of the class described, the combination of means including a pair of power members, a fluid, nestled fluid drive elements differently speed drive connected to one of the said power members, a single fluid drive element drive connected to the other said power member, and drive control members positioned in the path of the said fluid flowing between the said single element and the said nestled elements and formed with unsymmetrically spaced apart fluid openings, said control members also differently speed drive connected to one of the said power members, said control members formed with like toothed portions meshing with a common pinion, said pinion mounted for rotation with a shaft connected to a manually actuated portion.

14. In a device of the class described, the combination of means including a pair of power members, a fluid, nestled fluid drive elements unlike speed drive connected to one of the said power members and a single fluid drive element drive connected to the other said power member, universal fluid drive control members positioned between the said single element and the said nestled elements and unlike speed drive connected to one of the said power members, and remotely positioned manually actuated selective fluid drive control means operatively connected to the said control members thereby to selectively control the fluid drive action of the said nestled fluid drive elements and the said single element independently of fluid action on the said fluid drive control means.

15. In a device of the class described, the combination including a driving member and a driven member, a fluid, a plurality of nestled fluid drive impeller elements unlike speed drive connected to to the driving member and a single fluid drive runner element drive related to the said driven member and fluid drive related to the said impeller elements, unlike disc shaped drive control members unlike speed drive related to the said driving member, said control members formed with spaced fluid openings and cammed portions for varying the fluid drive relations of the said impeller and runner elements as a function of the drive resistance of the driven member and the spacing of the said openings, and remotely positioned manually actuated means operatively connected to the said drive control means to thereby control the said fluid drive relation independently of the said control members.

16. A torque converting device including a pair of power members, a fluid, nestled fluid drive elements unlike speed drive related to one of the said members, a single fluid drive element drive related to the other member and fluid drive related to the said nestled elements, and a plurality of unlike perforated fluid drive control elements unlike speed drive related to one of the said members, said control elements formed with cammed portions positioned in the paths of portions of the said fluid so that the fluid will act on the cammed portions to thereby energize the said control elements.

17. A power transmission mechanism including a pair of power members, a fluid, nestled fluid drive elements unlike speed drive related to one of the said power members, a single fluid drive element fluid drive related to the said nestled elements and positive drive related to the other said power member, means mounted for movement between the said single element and the said nestled elements and in the path of the said fluid for changing the said fluid drive relations of the said elements when acted upon by the said fluid, said relation changing means formed with cammed openings for the passage of the said fluid, and means for enclosing the said means and the said fluid.

18. A power transmission mechanism including a pair of power members, a fluid, nestled fluid drive elements unlike postive speed drive connected to one of the said power members, a common fluid drive element fluid drive related to the said nestled elements and positively drive related to the other said member, a plurality of loosely mounted disc shaped fluid drive control members positioned one after the other in the path of the said fluid, said control members formed with bidirectional cammed openings for the passage of fluid by and between the said elements whereby the said flow between the individual nestled elements and the said common element is a function of the load resistance of the driven member.

19. A torque converting device including a pair of power members, a fluid, nestled fluid drive elements each separately speed drive connected to one of the said power members, a single fluid drive element in drive relation to the other said power member, fluid drive control members positioned between the said nestled elements and the said single element, and manually actuated selective means for moving and setting the said control members relative to each other thereby to vary the flow of the said fluid by and between the said single element and the said nestled elements.

20. In a combined automatic torque connecting and manually selective fluid drive transmission device including a fluid, drive and driven members, a plurality of nestled fluid coupling elements each in speed drive relation with one of the said members, a single fluid couple element in positive speed drive relation with the other said power member and in fluid drive relation with the said nestled elements individually and collectively, and drive control members formed with groups of openings arranged to be co-operatively associated by a common pinion, and means for manually actuating the said pinion, said members also provided with cammed openings for automatically and independently varying the operative relation of the said openings.

21. A power mechanism including power members, fluid, nestled drive elements speed drive related to one of the said members, a single drive element drive related to the other member and fluid drive related to the said nestled elements, and drive control means speed drive related to certain of the said nestled elements, said drive control means formed with openings, blocking portions, cammed portions, toothed portions and a common pinion for said toothed portions, a shaft for the said common pinion, and resilient ball detents for effecting a hunting actio nof the said shaft when acted upon by portions of the said fluid moving against the said cammed portions.

HOWARD J. MURRAY.